(12) United States Patent
Heiden

(10) Patent No.: US 6,489,973 B1
(45) Date of Patent: Dec. 3, 2002

(54) IMAGE ACQUISITION ARCHITECTURE

(75) Inventor: Don Heiden, Grass Valley, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/411,404

(22) Filed: Oct. 4, 1999

(51) Int. Cl.[7] .................................................. G06F 3/00
(52) U.S. Cl. ....................... 345/771; 358/403; 358/443; 382/276; 382/305
(58) Field of Search .................................. 358/400, 403, 358/505, 443; 382/305, 276; 345/771, 970

(56) References Cited

U.S. PATENT DOCUMENTS

| | | | | |
|---|---|---|---|---|
| 5,226,118 A | * | 7/1993 | Baker et al. ................. | 345/833 |
| 5,463,702 A | * | 10/1995 | Trueblood ................... | 382/239 |
| 5,696,600 A | * | 12/1997 | Perkins ....................... | 358/442 |
| 5,706,457 A | * | 1/1998 | Dwyer et al. ................ | 345/853 |
| 5,793,647 A | * | 8/1998 | Hageniers et al. ............ | 702/35 |
| 6,058,428 A | * | 5/2000 | Wang et al. ................. | 709/232 |
| 6,069,982 A | * | 5/2000 | Reuman ..................... | 382/275 |
| 6,124,893 A | * | 9/2000 | Stapleton .................... | 348/441 |
| 6,210,327 B1 | * | 4/2001 | Brackett et al. ............. | 600/437 |

* cited by examiner

Primary Examiner—Raymond J. Bayerl
Assistant Examiner—Cuong T. Thai
(74) Attorney, Agent, or Firm—Fitzpatrick, Cella, Harper & Scinto (57) ABSTRACT

An image acquisition architecture includes a device class representing a physical image acquisition device, a storage class representing storage areas of the image acquisition device, a package class representing sets of data files stored in a storage area of the image acquisition device, and an item class representing individual data files within the sets of data files stored in the storage area of the image acquisition device.

9 Claims, 6 Drawing Sheets

PICTURE PACKAGE

| FULL IMAGE ITEM |
| --- |
| THUMBNAIL IMAGE ITEM |
| SOUND ITEM |

FIG. 7

VIDEO PACKAGE

| VIDEO CLIP ITEM |
| --- |
| SOUND CLIP ITEM |
| TEXT FILE ITEM |

FIG. 8

IMAGE ACQUISITION ARCHITECTURE

BACKGROUND OF THE INVENTION

1. Field of the Invention

The present invention relates to an architecture for use in interfacing with image acquisition devices. More specifically, the present invention relates to an architecture usable by both PC and non-PC devices to communicate with many types of image acquisition devices through a common interface.

2. Description of the Related Art

Modern home computing systems include peripheral devices and software applications produced by many different manufacturers. For example, a typical home computer includes word processing, image processing, and spreadsheet applications as well as peripheral devices such as printers, scanners and digital cameras, all of which may be produced by different manufacturers. For such applications and devices to be marketable, the manufacturers must ensure that each of the applications executing on the user's computer can communicate with each of the peripheral devices.

Standardized interfaces have developed in order to facilitate this communication. These interfaces include functions that must be supported by complying peripheral devices and protocols for calling and executing the functions. Accordingly, in order to support an interface, a manufacturer of a peripheral device must simply provide a corresponding device driver, a piece of software code, which presents the functions of the interface to a requesting application, and which interacts with the peripheral device to provide the functions. On the other hand, because of the standardized interface, an application developer need only write code to access the particular functions using the particular protocols, and does not need to write code addressing any specific peripheral devices. The presented functions are commonly referred to as an Application Programming Interface (API).

One example of such an interface is the TWAIN interface, which was developed for use with scanning devices. As described above, TWAIN defines a set of functions and protocols which can be used by an application developer to access scanning devices, and which must be supported by TWAIN-compatible device drivers corresponding to particular scanning devices. A similar interface is provided by Windows Image Acquisition (WIA), an architecture which also defines a standardized interface between applications and scanning devices.

These currently-existing interfaces are unsatisfactory for several reasons. First, the interfaces are not platform-independent. Specifically, TWAIN is defined only for Macintosh and Windows platforms, and WIA is defined only for the Windows platform. This shortcoming is especially disadvantageous given the current trend of platform-independent computing and the emergence of non-PC devices, such as hand-held devices, personal digital assistants (PDAs) and set top boxes.

Moreover, TWAIN is defined only for image and sound acquisition and WIA is defined only for image and limited text acquisition. As a result, these interfaces cannot be used to easily access each of a wide range of image acquisition devices, including scanning devices, digital cameras, digital video devices and analog video devices.

One reason for the latter shortcoming is that conventional image acquisition devices often contain related data files. Specifically, a single "picture" stored in a digital camera may consist of a full-resolution image file, a thumbnail image file and a sound file. However, image acquisition interfaces define, in object-oriented terms, one class representing an image acquisition device and a second class representing individual data files within the device. Accordingly, although it would often be useful to manipulate related data files as a single entity, conventional image acquisition interfaces do not provide any simple means for doing so.

In addition, image acquisition devices such as digital video cameras may include two separate storage devices, such as digital tape and a removable still image storage device. Since, as described above, conventional image acquisition interfaces define only a single class representing a device and a single class representing files within the device, the separate storage devices cannot be represented and managed individually using the conventional interfaces.

In view of the foregoing, what is needed is an image acquisition architecture which provides a common interface for accessing many types of imaging devices via both PC and non-PC devices.

SUMMARY OF THE INVENTION

The present invention addresses the foregoing by providing an image acquisition architecture including a device class representing a physical image acquisition device, a storage class representing storage areas of the image acquisition device, a package class representing a set of data files stored in a storage area of the image acquisition device, and an item class representing individual data files within the set of data files stored in the storage area of the image acquisition device.

By virtue of the foregoing, the present invention allows simple manipulation of many types of image acquisition devices. In particular, a digital camera can be represented by a device class, its internal memory card may be represented by a storage class, each "picture" in the memory card may be represented by a package class, and a full-resolution image, a thumbnail image file and a sound file corresponding to each "picture" may be represented as item classes within a single package. Similarly, multiple storage devices in a digital video camera can each be represented as separate storage classes within a single device class. As a result, manipulation and access of storages, packages and items within a device is greatly simplified.

In another aspect, the present invention concerns an application programming interface for use in interfacing with image acquisition devices, the interface including a function to access properties of a device class, the device class representing a physical image acquisition device, a function to access properties of a storage class, the storage class representing storage areas of the image acquisition device, a function to access properties of a package class, the package class representing sets of data files stored in a storage area of the image acquisition device, and a function to access properties of an item class, the item class representing individual data files within the sets of data files stored in the storage area of the image acquisition device.

The foregoing aspect of the invention provides simple manipulation of the above-described device, storage, package and item classes by a client application and allows efficient interfacing with many types of image acquisition devices.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
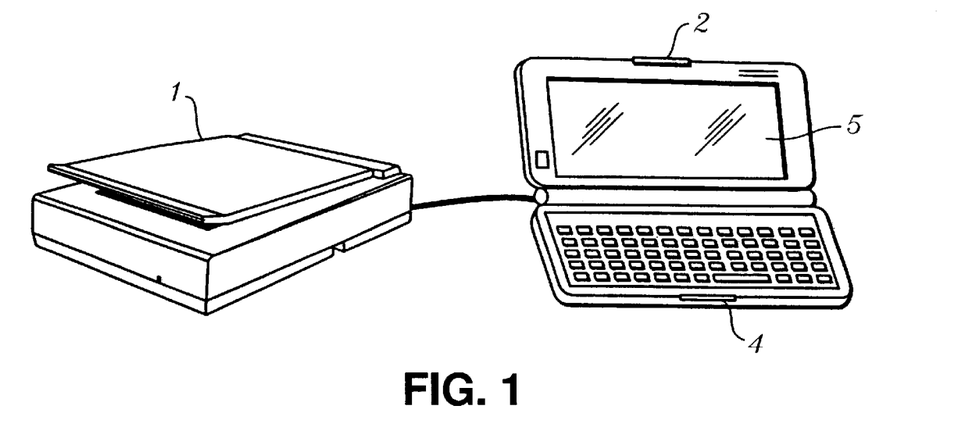
FIG. 1 is a view of a hardware configuration embodying the present invention.

FIG. 1 is a view of a hardware configuration for use in conjunction with the present invention. Shown in FIG. 1 is scanner 1, which scans an image to produce 24-bit color data (8 bits each of red, green and blue data) and which communicates via a USB interface. It should be noted that other types of scanners, such as black and white scanners, are also contemplated for use with the present invention.

Connected to scanner 1 is hand-held computing device 2, which executes an operating system designed for hand-held devices, such as Windows CE 2.0, on a MIPS RISC processor and includes 16 Megabytes RAM. Like any standard personal computer, hand-held device 2 stores application programs in memory and executes those programs using its internal processor. During program execution, hand-held device 2 accepts user input through keyboard 4 and displays images and text via LCD display 5. Of course, in the configuration shown in FIG. 1, data can also be input to hand-held device 2 through scanner 1.

Figure 2:
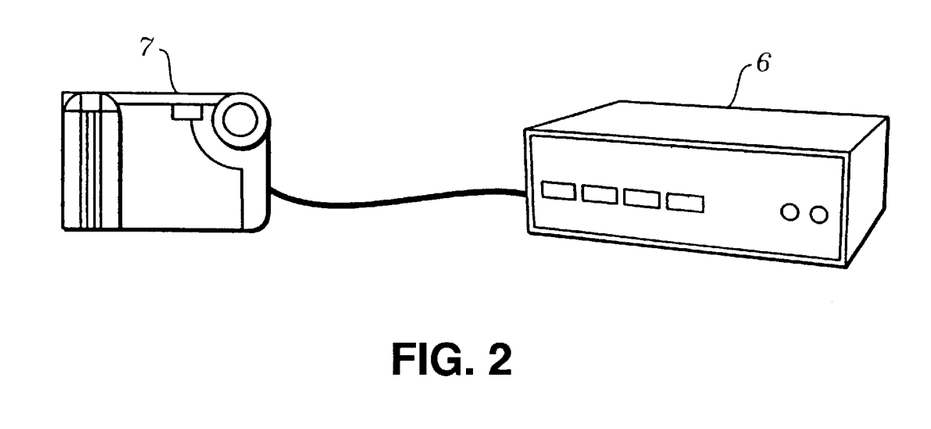
FIG. 2 is a view of a hardware configuration embodying the present invention.

FIG. 2 is an outward view of another hardware configuration contemplated for use in conjunction with the present invention. In this regard, FIG. 2 shows set top box (STB) 6 connected to digital camera 7, which is also a 24-bit RGB device. It should be noted that both scanners and digital cameras can produce and store other image formats, such as JPEG and TIFF. Moreover, the present invention can be used in conjunction with image formats other that 24-bit RGB.

A STB is a device designed for home use which receives cable television signals and is capable of requesting and receiving web pages via the Hypertext Transfer Protocol (HTTP). In a preferred embodiment, STB 6 runs the PowerTV operating system and executes PersonalJava thereon so as to provide a Java Virtual Machine for executing programs written in the Java programming language.

Like device 2, STB 6 is a non-PC device. Advantageously, the invention provides STB 6 with access to image acquisition devices. For example, using the present invention, a home user of STB 6 can retrieve images from camera 7 and post the images to a website.

Contemplated hardware configurations other than those shown in FIG. 1 and FIG. 2 include connection of hand-held device 2 or STB 6 to a printer converted into a scanner through substitution of a scanning head for a printer cartridge, an analog video device such as a video camera, or a digital video device such a digital video camera, DVD player or the like. Therefore, in contrast to those conventional systems described above, the present invention provides communication between an application executing on a PC or non-PC device and a myriad of image acquisition devices.

Figure 3:
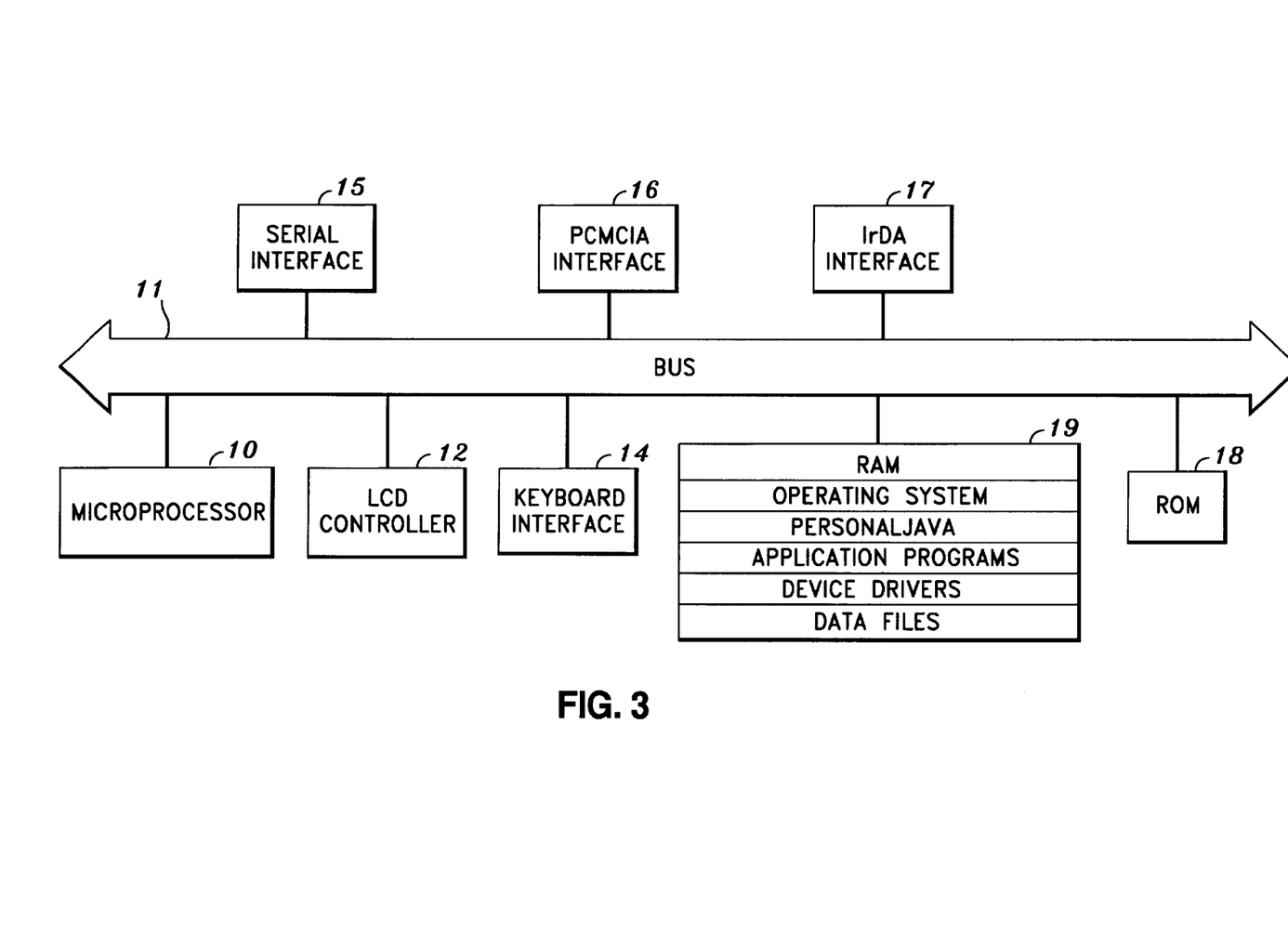
FIG. 3 is a block diagram of the internal architecture of a hand-held computing device.

FIG. 3 is a block diagram of the internal architecture of hand-held device 2. Shown in FIG. 3 is RISC microprocessor 10 connected to bus 11. Also connected to bus 11 are LCD controller 12 for controlling LCD display 5 and keyboard interface 14 for accepting input from keyboard 4. Serial interface 15, PCMCIA interface 16 and IrDA interface 17 are connected to bus 11 and allow device 2 to communicate with peripheral devices over serial, PCMCIA, and IrDA protocols, respectively.

ROM 18 provides permanent storage of processor-executable process steps such as basic input/output services (BIOS), keyboard control and the like. As shown, RAM 19 stores, among other data, operating system files, Personal-Java files, application programs, device drivers and data files. The operating system files include processor executable process steps executable to provide the Windows CE 2.0 operating system. Accordingly, the stored application programs may be written for execution on the CE 2.0 operating system. Preferably, the application programs are written in Java and executed using a Java Virtual Machine provided by the PersonalJava operating system.

Returning to the STB configuration of FIG. 2, it is also preferable to write application programs for execution therein using the Java programming language and to execute the programs through a Java Virtual Machine. As described, the Java Virtual Machine is provided by PersonalJava executing on a PowerTV platform, but could also be used with other STB platforms.

Typical application programs executing on hand-held device 2 include a calendar application, a spreadsheet application, an electronic mail application, and a word processing application. In operation, processor executable process steps of an application program are executed by microprocessor 10. During execution of these steps, it may be necessary to access a peripheral device through one of interfaces 15, 16 or 17. Accordingly, RAM 19 is provided with device drivers corresponding to particular peripheral devices. Details of the application/device driver/device architecture will be discussed in detail below.

Figure 4:
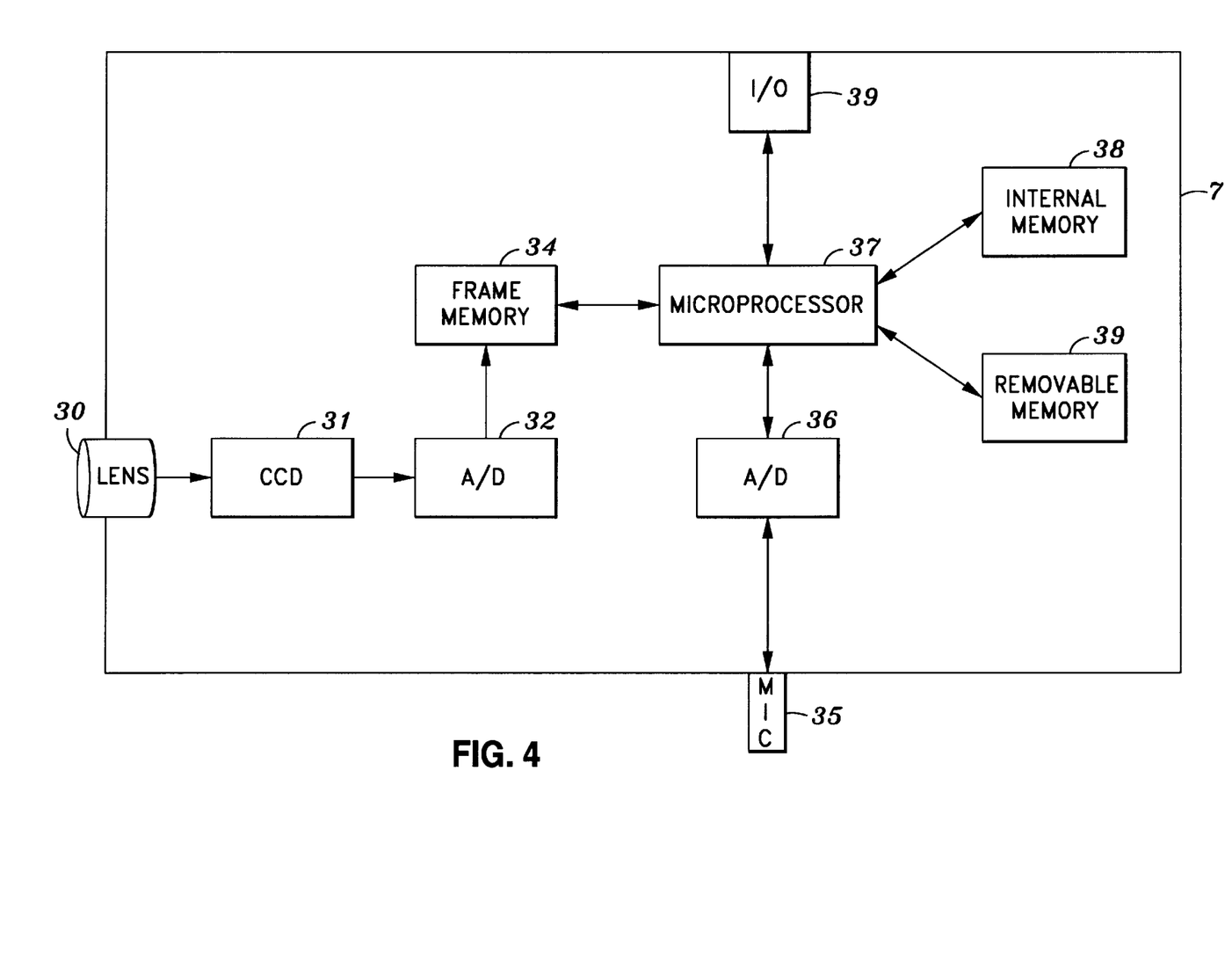
FIG. 4 is a block diagram of the internal architecture of a digital camera.

FIG. 4 is a block diagram of the internal architecture of digital camera 7. It should be noted that FIG. 4 shows one type of digital camera which may be used in conjunction with the invention, and that other digital cameras having different architectures may also be used in conjunction with the invention.

Camera 7 includes lens 30 for gathering light waves from objects toward which lens 30 is pointed, charge-coupled device 31 for translating the received light waves into analog signals, analog-to-digital (A/D) converter 32 for,converting the analog signals into digital signals, and frame memory 34 for storing a single picture frame. Digital camera 6 also includes microphone 35 for receiving analog sound waves during capture of a picture, and (A/D) converter 36 for converting the captured sound waves into digital form.

Elements 30 to 36 are controlled by microprocessor 37, which stores a picture from frame memory 34 into internal memory 38. As described above, microprocessor 37 stores a captured picture in internal memory 38 as a full-resolution (e.g., 1024×768 pixel) image file and as a thumbnail (e.g., 80×60 pixel) image file. In addition, microprocessor 37 stores digitized sound from A/D converter 36 as sound files in internal memory 38 associated with corresponding image files. Removable memory 39 may be a floppy disk or laser-readable disk, and also stores full-resolution image files, thumbnail image files and sound files as described above. During operation of camera 7, a user may choose to store files in either internal memory 38 or removable memory 39.

I/O module 39 is also controlled by microprocessor 37 to provide connectivity to external devices. I/O module 39 preferably includes an RS-232 serial I/O port for direct connectivity to hand-held device 2.

Figure 5:
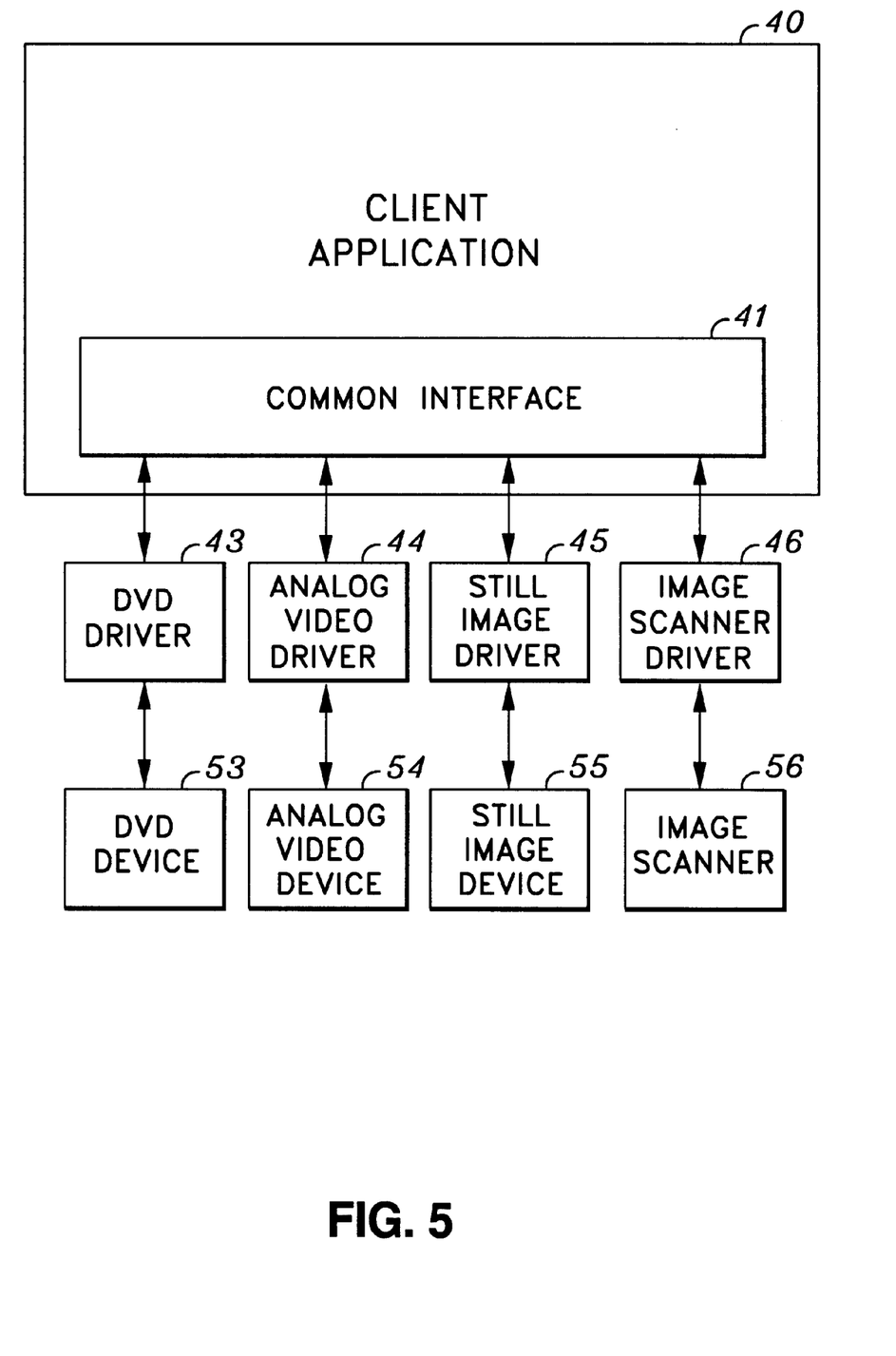
FIG. 5 is a block diagram of a software architecture embodying the present invention.

FIG. 5 is a block diagram of a system utilizing the present invention. In particular, client application 40 generally represents any application requiring services of an image acquisition device. In the present embodiment, client application 40 is stored in RAM 19 of device 2. Notably, client application 40 has been developed to communicate with image acquisition devices via common interface 41. More specifically, a developer of client application 40 need not be concerned with particular characteristics of image acquisition devices which may be used by client application 40. Rather, client application 40 is written so as to call particular functions according to particular protocols defined by common interface 41.

It should be noted that common interface 41 is similar to the TWAIN and WIA interfaces in that they each define an API. However, in contrast to TWAIN and WIA, common interface 41 provides efficient access to many types of image acquisition devices and platform independence.

Software drivers 43 to 46 are preferably developed by manufacturers of corresponding image acquisition devices 53 to 56. These drivers support common interface 41. That is, drivers 43 to 46 interpret the function calls made by client application 40 and provide appropriate actions and responses as defined by common interface 41. Specifically, digital video device driver 43 may be called by client application 40 to access a video clip. In response, DVD driver 43 interfaces with DVD device 53 to extract a requested video clip and delivers the video clip to client application 40 via common interface 41. Similar relationships exist between analog video driver 44 and analog video device 54, still image driver 45 and still image device 55, and image scanner driver 46 and image scanner 56.

Figure 6:
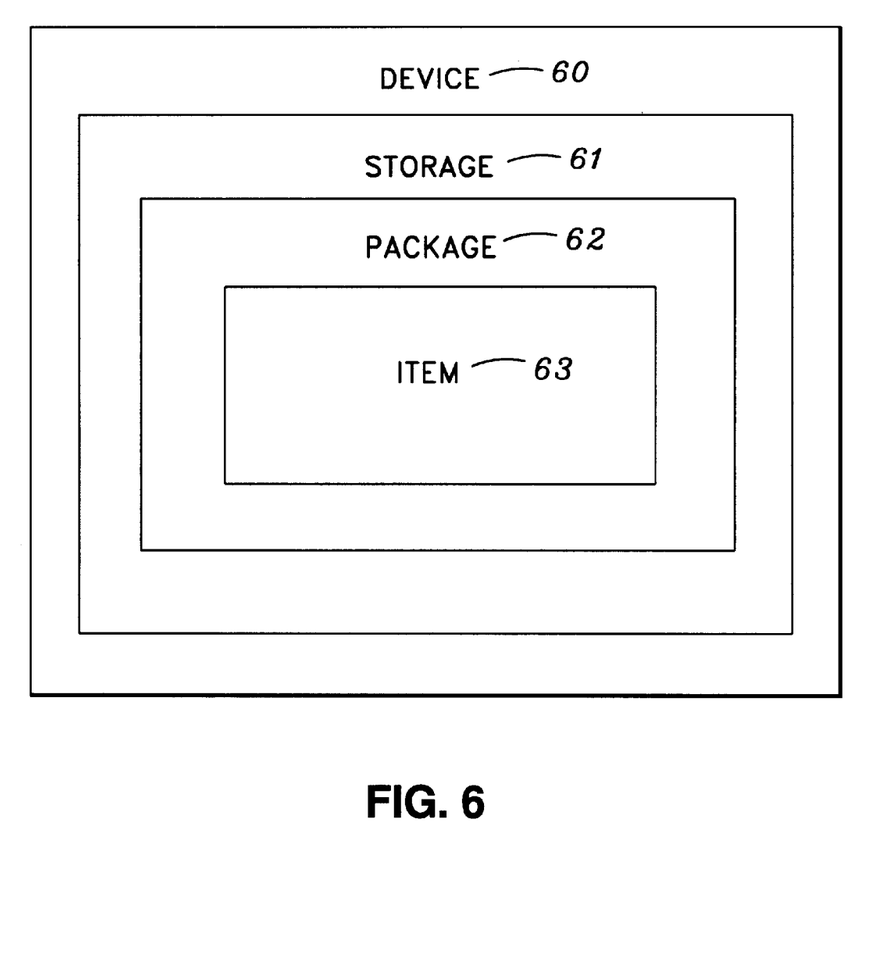
FIG. 6 is a diagram illustrating layers of abstraction according to the present invention.

As mentioned above, conventional image acquisition interfaces are unsatisfactory because they do not provide a framework of abstract classes using which many different types of image acquisition devices can be effectively represented. In this regard, FIG. 6 illustrates abstract classes and their relationships according to the present invention. The illustrated levels of abstraction are utilized by the present invention to provide efficient abstraction of and access to many types of image acquisition devices.

Device level of abstraction 60 is representative of a physical image acquisition device. Therefore, according to the present invention, methods and properties applicable to an entire device are preferably encapsulated in a Device class. Storage level of abstraction 61 represents individual storage areas within a device. For example, internal memory 38 and removable memory 39 of digital camera 7 are represented by separate storage classes according to the present invention. By virtue of this representation, individual storage areas within a single image acquisition device can be efficiently managed and manipulated.

Package layer of abstraction 62 represents a set of files stored in a particular storage. Finally, item layer of abstraction 63 represents a particular item that contains a specific piece of information or data.

Figure 7:
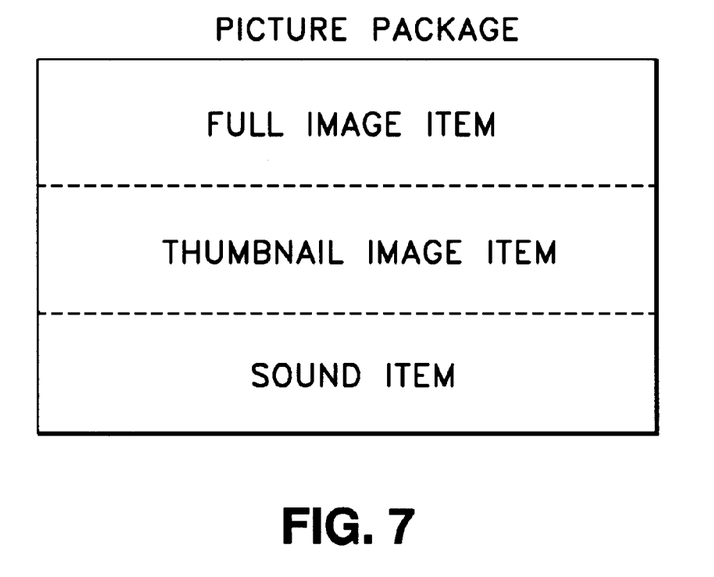
FIG. 7 illustrates a use of the package and item levels of abstraction according to the present invention.
Figure 8:
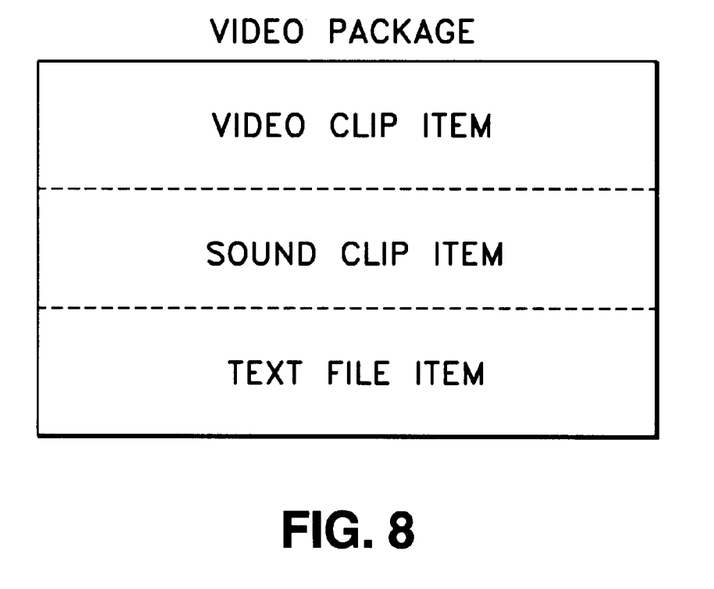
FIG. 8 illustrates a use of the package and item levels of abstraction according to the present invention.

FIG. 7 and FIG. 8 illustrate the package/item relationship. For example, as described above, a "picture" taken by a digital camera consists of a high-resolution full image file, a thumbnail image file, and a sound file. Referring to the levels of abstraction shown in FIG. 6, each of the individual files is represented by an Item class, while the total "picture" is represented by a Package class. As a result of this abstraction, entire "pictures" can be efficiently managed and manipulated.

Turning to FIG. 8, the video package is shown representing each of a video clip item, a sound clip item and a text file item. By relating these three particular items into a single package, the items can be processed as a single entity, thereby simplifying further processing.

It has been previously stated that the levels of abstraction illustrated in FIG. 6 to FIG. 8 can be used by a client application to easily and efficiently manage and manipulate image acquisition devices. Specifically, an API according to the present invention can be used by a client application to acquire sound, images or video clips from a device, or to change a setting on the device. The following is an explanation of such uses by a client application.

Initially, a client application connects to a device to access properties of the device. A representative list of device properties can be found in Appendix A within a table labeled "UIADeviceProperties". Appendix A also details other properties and methods of an API according to the present invention. Reference to Appendix A will assist the reader in even more fully understanding the following examples.

In this regard, the following code can be used to open communication to a device, to obtain properties of the device and the total number of storages in the device (i.e., internal memory 38 and removable memory 39=two storages), and to close communication to the device.

```
//////////////////////////////
// Define all variables
UIADeviceProperties      deviceProperties;
Long                     totalstorage=new
Long ( );
// Open device for use
DriverName.open (" ");
// Get device properties for UIA driver
deviceProperties = DriverName.getDeviceProperties( );
// Get total storage property from device property
group
deviceProperties.getProperty("TOTAL_STORAGE",
totalStorage);
// Close device
DriverName.close ( );
//////////////////////////////
```

After obtaining the number of storages in a device, an API according to the present invention can be used to acquire details about specific storages in the device. For example, the following code searches for a tape storage named "CHRISTMAS_1998".

```
//////////////////////////////
// Define all variables
UIAStorageProperties    storageProperties;
Long                    totalPackages=new
Long( );
```

```
            -continued
String               storageType=new
String( );
Date                 storageName=new
String( );
long                 currentStorage;
// Find tape storage with the name "CHRISTMAS_1998"
for(currentStorage=1; currentStorage<=totalStorage;
currentStorage)
{
        storageProperties=DriverName.getStorage
        Properties (currentStorage++);
        storageProperties.getProperty ("STORAGE_
        NAME", storageName);
        storageProperties.getProperty ("STORAGE
        TYPE", storageType);
        if(storageType=="TAPE"&&storageName==
        "CHRISTMAS_1998")
        break;
}
// Get total package within desired storage area
storageProperties.getProperty ("TOTAL_PACKAGES",
totalPackages);
////////////////////////////////
```

Notably, the foregoing code also obtains the total number of packages within the located storage.

Using the obtained number of packages, a specific package can be obtained, its properties examined, and a total number of items therein determined. One method is shown below.

```
////////////////////////////////
// Define all variables
UIAPackageProperties    packageProperties;
Long                    totalItems=new Long( );
String                  packageContents=new
                        String( );
Date                    packageDate=new Date ( );
long                    currentPackage;
// Find Package with still image contents created on
a specific date
for(currentPackage=1; currentPackage<=totalPackages;
currentPackage++)
{
        packageProperties=DriverName.getPackage
        Properties (currentStorage,
currentPackage);
        packageProperties.getProperty ("PACKAGE_
        CONTENTS", packageContents);
        packageProperties.getproperty ("PACKAGE_
        DATE", packageDate);
        if(packageContents=="STILLIMAGE"&&package
        Date=="10/25/97")
        break;
}
// Get total items within desired package
packageProperties.getProperty ("TOTAL_ITEMS",
totalItems);
////////////////////////////////
```

As can be understood, the above method locates a package of still images created on Oct. 25, 1997 and determines how many items are within the desired package.

The client application is usually most interested in obtaining item objects. Item objects can represent a wide variety of data, such as images, video clips, sounds annotations and text files. Since a device can contain any number of items, the client application must first determine which item object to obtain. As demonstrated by the foregoing sample code, the item itself is contained within several layers of abstraction starting at storage. Therefore, in order to obtain an item, the storage, package and item must be designated in the getItem method as shown below, where UIAItem is the desired Item object to be accessed.

UIAItemDriverName.getItem(long currentStorage, long current-
    Package, long currentItem)

Once an item object is obtained, its properties and methods can be accessed. The following is an example of such access.

```
////////////////////////////////
// Define all variables
UIAItem              ItemObject;
Long                 currentItem=new Long( );
UOAItemProperties    itemProperties;
String               itemType=new String( );
String               itemFormat =new
String( );
// Get item object
if (totalItems>0)
        currentItem=1;
ItemObject DriverName.getItem(currentStorage,
        currentPackage, currentItem)
// Get item property group
itemProperties = ItemObject.getItemProperties ( );
// Access item properties
itemProperties.getProperty ("ITEM_TYPE", itemType);
itemProperties.getProperty ("ITEM_FORMAT",
itemFormat);
// Process item type and format
if (itemType=="STILLIMAGE" && itemFormat=="JPEG")
        do still image JPEG task;
else if (itemType=="VIDEO" && itemFormat=="AVI"
        do AVI video task;
else if (itemType=="TEXT" && itemFormat=="ASCII")
        do ASCII text task;
else if (itemType=="SOUND" && itemFormat=="WAV")
        do WAV sound task;
////////////////////////////////
```

Once a client application has accessed an item object and has determined it's type and format, the client application may also obtain data from the item. This is accomplished by executing item methods such as "READ" OR "WRITE". The following is an example of a "READ" command which might be used in conjunction with the previous code.

if (itemType=="STILLIMAGE" && itemFormat=="JPEG")

ItemObject.executeMethod("READ", " ", imageJPEG);

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

| Class | Properties | Methods |
|---|---|---|
| IAPropertyGroup.class | Determined by derived class | GetProperty<br>SetProperty<br>EnumerateProperties |
| UIAItem.class | UIAItemProperties | GetItemProperties<br>ExecuteMethod |
| UIADriver.class | UIADeviceProperties<br>UIAStorageProperties<br>UIAPackageProperties | GetDeviceProperties<br>GetStorageProperties<br>GetPackageProperties<br>Open<br>Close<br>GetItem<br>EnumerateItems<br>Execute Method |

METHOD NAME:

GetProperty
SYNTAX:

Boolean DriverName.getProperty(String propertyName, Object propertyValue)
PARAMETERS:

PropertyName — A string name identifying a specific property.
PropertyValue — The property returned as an Object.
DESCRIPTION:

Get specific property from property group.
RETURN VALUE:

Boolean value indicating success or failure.
METHOD NAME:

SetProperty
SYNTAX:

Boolean DriverName.setProperty(String propertyName, Object propertyValue)
PARAMETERS:

PropertyName — A string name identifying a specific property.
PropertyValue — The new property value.
DESCRIPTION:

Set specific property within property group.
RETURN VALUE:

Boolean value indicating success or failure.
METHOD NAME:

EnumerateProperties
SYNTAX:

Boolean DriverName.enumerateProperties()
PARAMETERS:

None
DESCRIPTION:

Enumerates all property names within a property group.
RETURN VALUE:

Boolean value indicating success or failure.
UIAItemProperties

ITEM_FORMAT
ITEM_TYPE

| PROPERTY NAME: | DATA TYPE: | ACCESS: |
|---|---|---|
| ITEM_FORMAT | String | Read Only |

DESCRIPTION:

Contains the item format.

-continued

PROPERTY VALUES:

JPEG, TIFF, BMP, GIFF, WAV, AVI, ASCII and DVD

| PROPERTY NAME: | DATA TYPE: | ACCESS: |
| --- | --- | --- |
| ITEM_TYPE | String | Read Only |

DESCRIPTION:

Contains the item type.
PROPERTY VALUES:

STILLIMAGE, TEXT, VIDEO_CLIP, VIDEO_STREAM, SOUND_CLIP and SOUND_STREAM
METHOD NAME:

GetItemProperties
SYNTAX:

UIAItemProperties ItemObject.getItemProperties()
PARAMETERS:

None
DESCRIPTION:

Obtains the UIAItemProperties component, which contains item properties.
DETAILS:

The UIAItemProperties component for an item type may also include type-specific
item properties.
RETURN VALUE:

Return the component UIAItemProperties.
METHOD NAME:

ExecuteMethod
SYNTAX:

Boolean ItemObject.executeMethod(String methodName, Object methodParameters)
PARAMETERS:

MethodName — String containing method name
Methodparameters — Object containing parameters to pass to method
DESCRIPTION:

The executeMethod utilizes the dynamic method model to execute a wide range of methods. All of these
dynamic methods pass or return objects. The actual object passed or returned depends on the method
called.
RETURN VALUE:

Boolean value indication success or failure.
UIADeviceProperties

OWNER_NAME
FIRMWARE_VERSION
MODEL_NAME
MODEL_NUMBER
DEVICE_TYPE
TOTAL_STORAGE

| PROPERTY NAME: | DATA TYPE: | ACCESS: |
| --- | --- | --- |
| FIRMWARE_VERSION | String | Read Only |

DESCRIPTION:

Maintains firmware version for specific device.
PROPERTY VALUES:

Any valid string value.

| PROPERTY NAME: | DATA TYPE: | ACCESS: |
| --- | --- | --- |
| OWNER_NAME | String | Read/Write |

DESCRIPTION:

Maintains device owner name, which the client sets.

-continued

PROPERTY VALUES:

Any valid string value.

| PROPERTY NAME: | DATA TYPE: | ACCESS: |
| --- | --- | --- |
| MODEL_NAME | String | Read Only |

DESCRIPTION:

Contains model name such as PowerShot or CanoScan.
PROPERTY VALUES:

Any valid string value.

| PROPERTY NAME: | DATA TYPE: | ACCESS: |
| --- | --- | --- |
| MODEL_NUMBER | String | Read Only |

DESCRIPTION:

Contains model number such as 350, A5 or 620. Sometimes model numbers are a combination of letters and numbers such as A5.
PROPERTY VALUES:

Any valid string value.

| PROPERTY NAME: | DATA TYPE: | ACCESS: |
| --- | --- | --- |
| DEVICE_TYPE | String | Read Only |

DESCRIPTION:

The device type refers to the type of imaging device such as still image or video.
PROPERTY VALUES:

STILLIMAGE, VIDEO and ALL

| PROPERTY NAME: | DATA TYPE: | ACCESS: |
| --- | --- | --- |
| TOTAL_STORAGE | Long | Read Only |

DESCRIPTION:

The total storage property specifies the total number of storage areas in the device.
UIAStorageProperties

STORAGE_TYPE
STORAGE_NAME
TOTAL_PACKAGES

| PROPERTY NAME: | DATA TYPE: | ACCESS: |
| --- | --- | --- |
| STORAGE_TYPE | String | Read Only |

DESCRIPTION:

Contains storage type such as TAPE or PCMCIA.
PROPERTY VALUES:

TAPE, PCMCIA, HARDDISK and MEMORY

| PROPERTY NAME: | DATA TYPE: | ACCESS: |
| --- | --- | --- |
| STORAGE_NAME | Long | Read Only |

DESCRIPTION:

Storage name represents a label name given to a specific storage area. The name itself consists of a single string value in uppercase such as "BOBS_BIRTHDAY".
PROPERTY VALUES:

Any valid string in upper case.

| PROPERTY NAME: | DATA TYPE: | ACCESS: |
| --- | --- | --- |
| TOTAL_PACKAGES | Long | Read Only |

DESCRIPTION:

Contains the total number of packages in the current storage area.
PROPERTY VALUES:

Any valid long value greater than zero.

-continued

UIAPackageProperties

PACKAGE_CONTENTS
PACKAGE_DATE
TOTAL_ITEMS

| PROPERTY NAME: | DATA TYPE: | ACCESS: |
|---|---|---|
| PACKAGE_CONTENTS | String | Read Only |

DESCRIPTION:

Contains information on the contents of the current package.

| PROPERTY NAME: | DATA TYPE: | ACCESS: |
|---|---|---|
| PACKAGE_DATE | String | Read Only |

DESCRIPTION:

Contains the creation date of the package.

| PROPERTY NAME: | DATA TYPE: | ACCESS: |
|---|---|---|
| TOTAL_ITEMS | Long | Read Only |

DESCRIPTION:

Contains the total number of items in the current package.
PROPERTY VALUES:

Any valid long value greater than zero.
METHOD NAME:

GetDeviceProperties
SYNTAX:

UIADeviceProperties DriverName.getDeviceProperties()
PARAMETERS:

None
DESCRIPTION:

Obtains the UIADeviceProperties component, which contains common device properties.
DETAILS:

For device properties details see the UIADeviceProperties tables.
For UIADeviceProperties method details see the property group section. All property groups share the same methods. However, the properties are determined by the implementation of UIADeviceProperties.
RETURN VALUE:

Return the component UIADeviceProperties.
METHOD NAME:

GetStorageProperties
SYNTAX:

UIAStorageProperties DriverName.getStorageProperties(long storageNumber)
PARAMETERS:

StorageNumber — Storage number to be obtained
DESCRIPTION:

Obtains the UIAStorageProperties component, which contains storage properties.
DETAILS:

For storage properties details see the UIAStorageProperties tables.
For UIAStorageProperties method details see the property group section. All property groups share the same methods. However, the properties are determined by the implementation of UIAStorageProperties.
RETURN VALUE:

Return the component UIAStorageProperties.
METHOD NAME:

GetPackageProperties
SYNTAX:

UIAPackageProperties DriverName.getPackageProperties(long storageNumber, package Number)
PARAMETERS:

StorageNumber — Storage number to be obtained
PackageNumber — Package number to be obtained
DESCRIPTION:

Obtains the UIAPackageProperties component, which contains package properties.

-continued

DETAILS:

For package properties details see the UIAPackageProperties tables.
For UIAPackageProperties method details see the property group section. All property groups share the same methods. However, the properties are determined by the implementation of UIAPackageProperties.
RETURN VALUE:

Return the component UIAPackageProperties
METHOD NAME:

Open
SYNTAX:

Boolean DriverName.open(String initializeDevice)
PARAMETERS:

InitializeDevice — Pass initialization string to device.
DESCRIPTION:

Opens a connection to the device.
RETURN VALUE:

Boolean indicating success or failure.
METHOD NAME:

Close
SYNTAX:

Boolean DriverName.close()
PARAMETERS:

None
DESCRIPTION:

Close a connection to the device.
RETURN VALUE:

Boolean indicating success or failure.
METHOD NAME:

ExecuteMethod
SYNTAX:

Boolean DriverName.executeMethod(String methodName, Object methodParameters)
PARAMETERS:

MethodName — String containing method name
MethodParameters — Object containing parameters to pass to method
DESCRIPTION:

The executeMethod utilizes the dynamic method model to execute a wide range of methods. All of these dynamic methods pass or return objects.
RETURN VALUE:

Boolean indicating success or failure.
METHOD NAME:

GetItem
SYNTAX:

UIAItem DriverName.getItem(long storageNumber, long packageNumber, itemNumber)
PARAMETERS:

StorageNumber — Storage number to be obtained
PackageNumber — Package number to be obtained
ItemNumber — Item number to be obtained
DESCRIPTION:

GetItem is used to obtain item objects from a package. The client can then access the item object.
RETURN VALUE:

UIAItem object.
METHOD NAME:

EnumerateItems
SYNTAX:

Boolean DriverName.enumerateItems()

-continued

PARAMETERS:

None
DESCRIPTION:

EnumerateItems is used enumerate each item within the device.
RETURN VALUE:

Boolean return success or failure.

What is claimed is:

1. An image acquisition architecture for use in interfacing with image acquisition devices, the architecture comprising:
   a device class representing a physical image acquisition device;
   a storage class representing storage areas of the image acquisition device;
   a package class representing sets of data files stored in a storage area of the image acquisition device; and
   an item class representing individual data files within the sets of data files stored in the storage area of the image acquisition device,
   wherein the item class represents both files containing image data and related files containing other than image data, and
   wherein each class defines an object-oriented abstraction which is common to each image acquisition device, storage area, package or item object defined using the class, and item objects are collectively manipulated via a package object.

2. An image acquisition architecture according to claim 1, wherein there is a one-to-one association between elements of the package class and images in the acquisition device.

3. An application programming interface for use in interfacing with image acquisition devices, comprising:
   a function to access properties of a device class, the device class representing a physical image acquisition device;
   a function to access properties of a storage class, the storage class representing storage areas of the image acquisition device;
   a function to access properties of a package class, the package class representing sets of data files stored in a storage area of the image acquisition device; and
   a function to access properties of an item class, the item class representing individual data files within the sets of data files stored in the storage area of the image acquisition device,
   wherein the item class represents both files containing image data and related files containing other than image data, and
   wherein each class defines an object-oriented abstraction which is common to each image acquisition device, storage area, package or item object defined using the class, and item objects are collectively manipulated via a package object.

4. An application programming interface according to claim 3, further comprising:
   a function to retrieve a set of data files represented by a package class.

5. An application programming interface according to claim 3, wherein the properties of the package class include package date and total items.

6. An application programming interface according to claim 3, wherein there is a one-to-one association between elements of the package class and images in the acquisition device.

7. Computer-executable process steps stored on a computer-readable medium, the process steps executable to interface with an image acquisition device, the steps comprising:
   a step to access properties of a device class, the device class representing a physical image acquisition device;
   a step to access properties of a storage class, the storage class representing storage areas of the image acquisition device;
   a step to access properties of a package class, the package class representing sets of data files stored in a storage area of the image acquisition device; and
   a step to access properties of an item class, the item class representing individual data files within the sets of data files stored in the storage area of the image acquisition device,
   wherein the item class represents both files containing image data and related files containing other than image data, and
   wherein each class defines an object-oriented abstraction which is common to each image acquisition device, storage area, package or item object defined using the class, and item objects are collectively manipulated via a package object.

8. Computer-executable process steps according to claim 7, the process steps further comprising a step to retrieve a set of data files represented by a package class.

9. Computer-executable process steps according to claim 7 wherein there is a one-to-one association between elements of the package class and images in the acquisition device.

* * * * *

UNITED STATES PATENT AND TRADEMARK OFFICE
CERTIFICATE OF CORRECTION

PATENT NO. : 6,489,973 B1
DATED : December 3, 2002
INVENTOR(S) : Don Heiden

It is certified that error appears in the above-identified patent and that said Letters Patent is hereby corrected as shown below:

Column 3,
Line 48, "that" should read -- than --; and
Line 50, "A" should read -- An --.

Column 4,
Line 55, "for,converting" should read -- for converting --.

Column 8,
Line 25, "UOAItemProperties" should read -- UIAItemProperties --.

Signed and Sealed this

Twenty-third Day of September, 2003

JAMES E. ROGAN
*Director of the United States Patent and Trademark Office*